Oct. 15, 1963    J. B. JONES ETAL    3,106,856
SUPPORT FOR WORKPIECE TO BE SUBJECTED TO VIBRATORY ENERGY
Filed Jan. 16, 1961
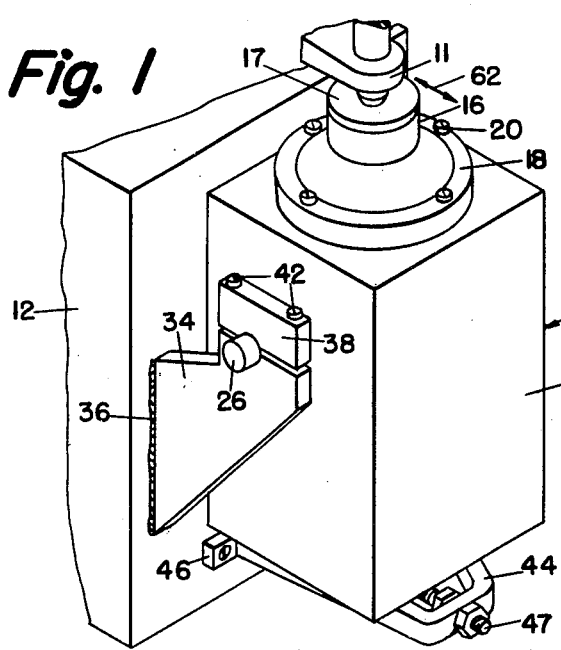
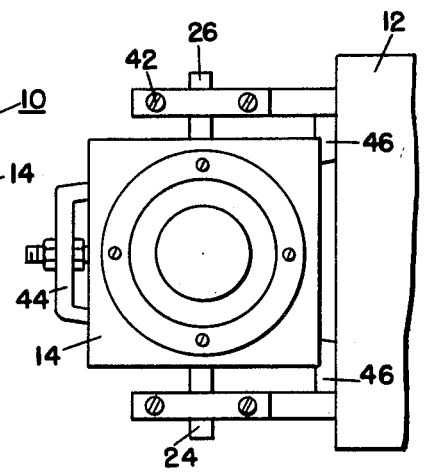
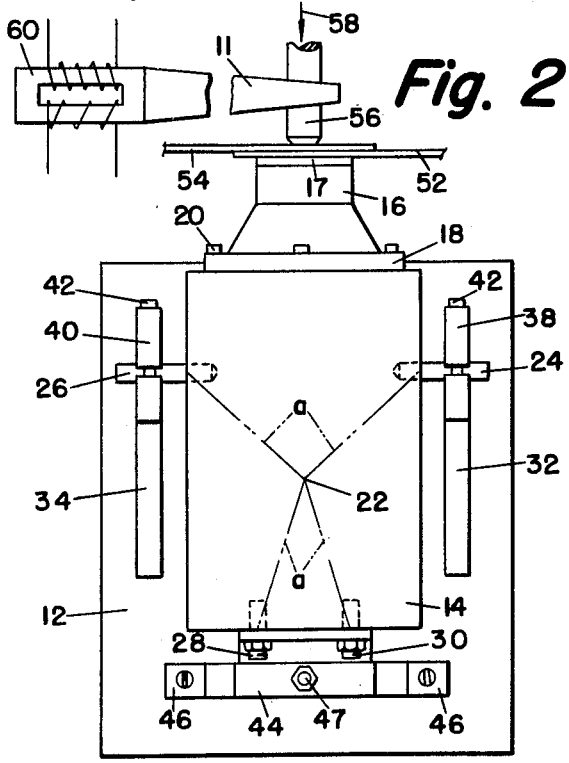
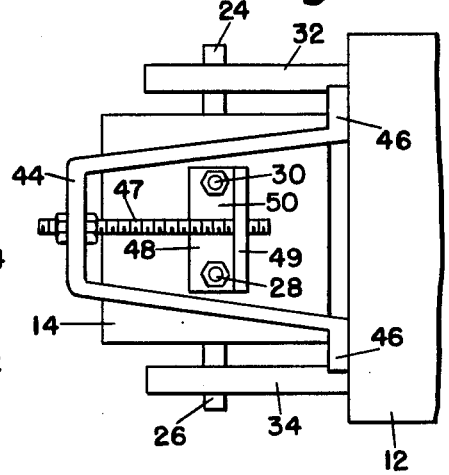
INVENTORS
JAMES BYRON JONES
NICHOLAS MAROPIS
BY *Arthur H. Seidel*
ATTORNEY United States Patent Office 3,106,856
Patented Oct. 15, 1963

3,106,856
SUPPORT FOR WORKPIECE TO BE SUBJECTED TO VIBRATORY ENERGY
James Byron Jones and Nicholas Maropis, West Chester, Pa., assignors to Aeroprojects Incorporated, West Chester, Pa., a corporation of Pennsylvania
Filed Jan. 16, 1961, Ser. No. 82,753
9 Claims. (Cl. 78—82)

This invention relates to a support for a workpiece to be subjected to vibratory energy. More particularly, this invention relates to apparatus for vibratory welding having a non-compliant support means for the workpieces undergoing welding.

Vibratory welding processes and apparatus have been described in United States Patent 2,946,119, issued July 26, 1960, entitled "Method and Apparatus Employing Vibratory Energy for Bonding Metals," in the names of James Byron Jones, William C. Elmore, and Carmine F. De Prisco. The disclosure in said patent is incorporated into the subject patent application and made a part hereof. Welding in accordance with the present invention may be effected under the conditions heretofore generally developed and set forth in the above-identified patent.

As disclosed in that patent, the support means for the workpieces (also described as a clamping jaw or anvil for force application or reaction thereto, a backing bar, a seat for the workpieces, etc.) may have various forms. Thus, it may be a jaw activated vibratorily in opposition to the vibratorily activated jaw which contacts the workpieces and introduces vibratory energy thereinto; it may be a rod-like member of regulated length so as to be, in effect, de-tuned at the applied frequency; it may be a heavy mass having no particular length; etc. For making reproducible quality welds with high power, the support means must be non-compliant to the applied vibration and must be rigid, so as to support without significant deflection large static (non-vibratory) clamping forces which maintain the workpieces in intimate contact at the intended weld zone.

It has been found in connection with the mass-type support that, under some circumstances, various mechanical components of the welding machine will resonate at the frequency of operation and thereby occasion the production of welds of inferior quality. It is the structural reaction against the forces of vibration that leads to energy transmission beyond the anvil and to resonance of the mechanical and structural components of the system. Thus, an anvil which is presumably non-compliant and rigid of itself may under some circumstances enable other members to vibrate sympathetically. Therefore, it is desirable to isolate the anvil from the welding machine so that vibratory power cannot be conducted through the anvil and be dissipated in vibration of structural or mechanical members of the machine.

It is an object of the present invention to provide a novel support means for workpieces which are subjected to vibratory energy.

It is another object of the present invention to provide a vibratory welding support means which will prevent or minimize anvil compliance at the vibratory welding operating frequency and thereby prevent dissipation of energy to the anvil and other structural members.

It is still another object of the present invention to provide a vibratory welding support means which is isolated from the welding machine so that vibratory power cannot be conducted through the anvil and be dissipated in vibration of structural or mechanical members.

Other objects will appear hereinafter.

For the purpose of illustrating the invention there is shown in the drawings a form which is presently preferred; it being understood, however, that this invention is not limited to the precise arrangements and instrumentalities shown.

FIGURE 1 is a perspective view of a vibratory welding array which includes the workpiece support of the present invention.

FIGURE 2 is a front view of the welding array shown in FIGURE 1 with the means for generating vibratory energy rotated 90 degrees for clarity of illustration.

FIGURE 3 is a top plan view of the workpiece support shown in FIGURES 1 and 2.

FIGURE 4 is a bottom plan view of the workpiece support shown in FIGURES 1-3.

Referring to the drawing in detail, wherein like numerals indicate like elements, there is shown in FIGURE 1 a vibratory welding array having a non-compliant support designated generally as 10. The vibratory welding array comprises the support 10, a means 11 for introducing vibratory energy into the workpieces adapted to be supported by the support 10, and a frame 12.

The support 10 includes a base 14 which may have any one of a variety of shapes. As shown in the drawing, the base 14 is a solid rectangular block of metal. The base 14 is provided with a removable anvil 16. The anvil 16 is provided with a base flange 18 which is removably secured to the base 14 by a plurality of screw fasteners 20. The base 14 may be a cylinder, a cube, etc. As shown more clearly by a comparison of FIGURES 2 and 3, the base 14 is preferably a rectangular solid having a length greater than the dimensions of its square end faces. The screw fasteners 20 extend through the base flange 18 into tapped holes in the base 14. The last mentioned tapped holes (not shown) may be equally spaced from the longitudinal axis of the base 14.

The anvil 16 is preferably removably secured to the base 14 since the anvil tip 17 which engages the workpieces is subject to a certain amount of wear. The anvil tip 17 is preferably a hard and tough face end not just a hard face. It is desirable to make the anvil 16 from a hard and tough high-density material such as copper, tungsten, etc. The anvil tip 17 is preferably made from a material such as Inconel X, René 41, Astralloy, etc.

For making reproducible quality welds with high power, the support 10 should be non-compliant to the applied vibration. All objects have a center of percussion such as is designated by the numeral 22 in FIGURE 2. The center of percussion of the base 14 is that point with respect to a given point of suspension at which an impulse applied perpendicular to the base 14 produces no impulsive reaction at the original point of suspension. The center of percussion coincides with the center of oscillation.

The base 14 is supported on a plurality of support elements 24, 26, 28 and 30. The support elements 24—30 may be rigidly secured to a side or bottom face of the base 14 in numerous ways. The elements 24—30 may be bolted to the base 14 or welded to a face of the base 14. Preferably, the elements 24—30 are threaded into blind tapped holes in the base 14. The manner in which the elements 24—30 are fixedly secured to the base 14 is of secondary importance. The most important feature in regard to the securement of the elements 24—30 to the base 14 is the linear distance between the center of percussion 22 and the point on the face of the base 14 at which the elements 24—30 are secured.

As shown more clearly in FIGURE 2, each of the elements 24—30 engages a face of the base 14 at points which are approximately equidistant from the center of percussion 22. The distance from said last mentioned points and the center of percussion 22 is approximately designated by the lines $a$. The elements 24 and 26 have longitudinal axes which are approximately parallel to one another and approximately equidistant from the longitudinal axis of the base 14. Thus, the base 14 is supported by elements which engage the base 14 at a plurality of spaced points which are approximately equidistant from the center of percussion 22.

The elements 24 and 26 are supported by a pair of brackets 32 and 34 respectively. The brackets 32 and 34 are fixedly secured to the frame 12 in any conventional manner such as by welding 36. The bracket 32 is provided with a cap block 38. The bracket 34 is provided with a cap block 40. The brackets 32 and 34 and the cap blocks 38 and 40 are each provided with a semi-circular recess for supporting the elements 24 and 26. For example, the semi-circular recess in the bracket 32 and the cap block 38 cooperate to support the cylindrical support elements 24.

If desired, the cap blocks 38 and 40 may be separate from the brackets 32 and 34 so that the support 10 may be removably secured to the frame 12. This feature enables bases of different masses to be substituted for one another. Each of the cap blocks 38 and 40 may be removably secured to the brackets 32 and 34 respectively by a plurality of bolts 42 which extend into tapped holes in the brackets 32 and 34.

A U-shaped bracket 44 is disposed beneath the base 14. The end flanges 46 of the U-shaped bracket 44 are fixedly secured to the frame 12 in any convenient manner. One end of a threaded bolt 47 extends through a hole in the bight portion of the U-shaped bracket 44. A nut is disposed on the bolt 47 on each side of the bight portion of the said bracket 44. The other end of the bolt 47 extends through a tapped hole in arm 49 of an L-shaped member 48.

Elements 28 and 30 are provided with threads on their outer surface. The elements 28 and 30 extend through holes in the arm 50 of the L-shaped member 48 into tapped holes in the base 14. As shown more clearly in FIGURES 2 and 4, arm 50 lies in a plane approximately parallel to the longitudinal axis of the bolt 47 and arm 49 lies in a plane approximately perpendicular to the longitudinal axis of bolt 47.

The bolt 47 and L-shaped member 48 permit the base 14 to be angularly rotated through a slight arc about the elements 24 and 26. This permits the plane of the face on the anvil tip 17 to be adjusted to prevent slippage of the workpieces during welding.

Experiments have indicated that certain advantages can be gained by mounting the support 10 about its center of percussion as set forth above. This arrangement essentially eliminates energy transfer to the frame 12, therefore the support 10 is essentially acoustically isolated from the frame 12. Thus, it is possible to ascertain resonant frequency and design the support 10 so that resonance associated with the welding frequency of the system can be avoided.

In some circumstances, as when the ultrasonic welding array is of a general geometry such as that disclosed in U.S. Patent 2,946,119, it has been found that the line of excursion of the welding tip may be slightly inclined to the plane of the face of the anvil tip 17. While this does not preclude welding, it does produce high twisting moments on the anvil base 14. This gives rise to deflections which are not vibratory but are static and more or less constant. Under these circumstances, when a high static force acts on the surface of the anvil tip 17, it is sometimes necessary to stiffen the static reactions of the elastically mounted anvil base 14.

While the support 10 has been described above in connection with a vibratory welding array, it will be appreciated that the support 10 is adapted to be used to support any type of workpiece which is subjected to vibratory energy.

The manner in which the means 11 for introducing vibratory energy into the metal members 52 and 54 joins said metal members 52 and 54 by a non-fusion weld is set forth in the above-identified patent. Therefore, it is not deemed necessary for the present construction to reiterate the manner in which the non-fusion weld is provided.

Experiments have shown that the elements 24 and 26 need not be separate elements. Satisfactory results have been obtained by using a single cylindrical element which is force fitted into a bore extending through the base 14 in place of the elements 24 and 26. If desired, elements 28 and 30 may be force fitted into their respective holes in base 14. It is to be emphasized that the support elements contact the base 14 at points which are approximately equidistant from the center of percussion 22. Satisfactory results have been attained when said points were substantially equidistant from the center of percussion 22.

Excellent results have been attained with a support 10 made with the following dimensions. The base 14 was made from steel and had dimensions 5⅛ x 4 x 4 inches. The anvil 16 was made from copper and had an overall height of 2 inches. The anvil tip 17 was made of DBL tool steel and had a ¼ inch thickness. The holes in the base 14 for receiving the screw fasteners 20 were drilled one inch deep and equally spaced on a circle having a 3.125 inch diameter with the center of the circle coinciding with the longitudinal axis of the base 14. The elements 28 and 30 were each one-half inch from the longitudinal axis of the base 14. The elements 24 and 26 were provided so that their longitudinal axes intersected a side face of the base 14 one and one-quarter inches below the top face of the base 14. These figures are merely exemplary and will vary depending upon the size of the base 14 and the material from which it is made.

As pointed out in U.S. Patent 2,946,119, the means 11 for introducing vibratory energy into the metal members 52 and 54 includes a vibratable member 56. A means is provided for impelling an end portion of said vibratable member 56 against an outer face of metal member 54 with a force in the direction of arrow 58 and of a magnitude to hold the to-be-welded faces of the metal members 52 and 54 in intimate contact at the intended weld zone and to couple mechanical vibratory energy into the intended weld zone. A means 60 is provided for vibrating the end portion of the vibratable member 56 at a frequency of between about 59 and 300,000 cycles per second in a path corresponding to the direction of the double headed arrow 62. The base 14 is dimensioned so as to be non-resonant at the applied frequency.

The double headed arrow 62 extends in a direction which is substantially perpendicular to the direction of arrow 58. Also, the arrow 62 extends in a direction substantially perpendicular to the longitudinal axis of the elements 24—30 and approximately parallel to the longitudinal axis of the bolt 47.

As pointed out above, the position of the support locations with respect to the center of percussion is an important feature of this invention. The geometry of the system has been devised so that the vibratory energy introduced by the vibratable member 56 does not excite the elements 24 and 26 into vibration under the conditions herein described. The direction of the vibratory energy introduced by member 56 is approximately parallel to the longitudinal axis of the bolt 47 and the direction in which anvil face alignment is accomplished.

The vibrating means 60 furnishes sufficient power so that the mechanical vibration delivered by the end portion of the vibratable member 56 is at a sufficient energy level to weld the metal members 52 and 54 together. The magnitude of the clamping force and the conditions under which welding is accomplished are set forth in the above enumerated patent and need not be reiterated herein.

The present invention may be embodied in other specific forms without departing from the spirit or essential attributes thereof and, accordingly, reference should be

We claim:

1. Apparatus for non-fusion welding contacting metal members together comprising a vibration-applying member, means for impelling an end portion of said vibration-applying member against an outer face of one of said contacting metal members with a force in a direction and of a magnitude to hold the to-be-welded faces of the metal members in intimate contact at the intended weld zone against an essentially non-compliant support, means connecting said support to a frame so as to be vibratorily isolated from said frame, and means for vibrating said end portion of said member at a frequency of between about 59 and 300,000 cycles per second in a path substantially perpendicular to the direction of the applied force while such to-be-welded faces of the metal members are being held in intimate contact by engagement with said end portion of said member, with said vibrating means furnishing sufficient power so that the mechanical vibration delivered by said end portion in said path is at a sufficient energy level to weld the metal members together.

2. Apparatus in accordance with claim 1 wherein said connecting means selectively provides for a slight amount of angular adjustment of said support relative to said frame, with the direction of said path being related to said support so that said mechanical vibration delivered by said end portion tends to rotate said support.

3. In an apparatus having means for introducing vibratory energy to a workpiece, a support for said workpiece, means connecting said support to a frame so that said support is vibratorily isolated from said frame so as to prevent the transmission of vibratory energy to said frame.

4. In an apparatus in accordance with claim 3 wherein said support includes an anvil base, and said connecting means includes a plurality of elements having one end fixedly secured to said base at spaced points substantially equidistant from the center of percussion of said base.

5. In an apparatus in accordance with claim 4 including an anvil, means removably securing said anvil to said base, with the longitudinal axis of said anvil coinciding with the longitudinal axis of said base.

6. In an apparatus in accordance with claim 4 wherein said means includes bracket means connecting said frame with a point on said elements spaced from said one end of said elements.

7. In an apparatus in accordance with claim 6 wherein said bracket means includes a bracket on opposite sides of said base, and a cap block removably supporting one of said elements on each of said brackets.

8. In an apparatus in accordance with claim 6 wherein said bracket means includes a bracket disposed beneath said base, one of said elements being positioned on each side of the longitudinal axis of said base and extending in a direction parallel to the longitudinal axis of said base.

9. In an apparatus in accordance with claim 3 wherein said means selectively provides for a slight amount of angular adjustment of said support with respect to said frame.

References Cited in the file of this patent
UNITED STATES PATENTS

| | | |
|---|---|---|
| 700,724 | Blood | May 27, 1902 |
| 1,080,238 | Stake | Dec. 2, 1913 |
| 1,324,492 | Branson | Dec. 9, 1919 |
| 1,618,773 | Meyers | Feb. 22, 1927 |
| 2,946,119 | Jones | July 26, 1960 |